No. 745,833. PATENTED DEC. 1, 1903.
P. HANSON.
TWINE CAN FOR HARVESTING MACHINES.
APPLICATION FILED FEB. 28, 1902.
NO MODEL.
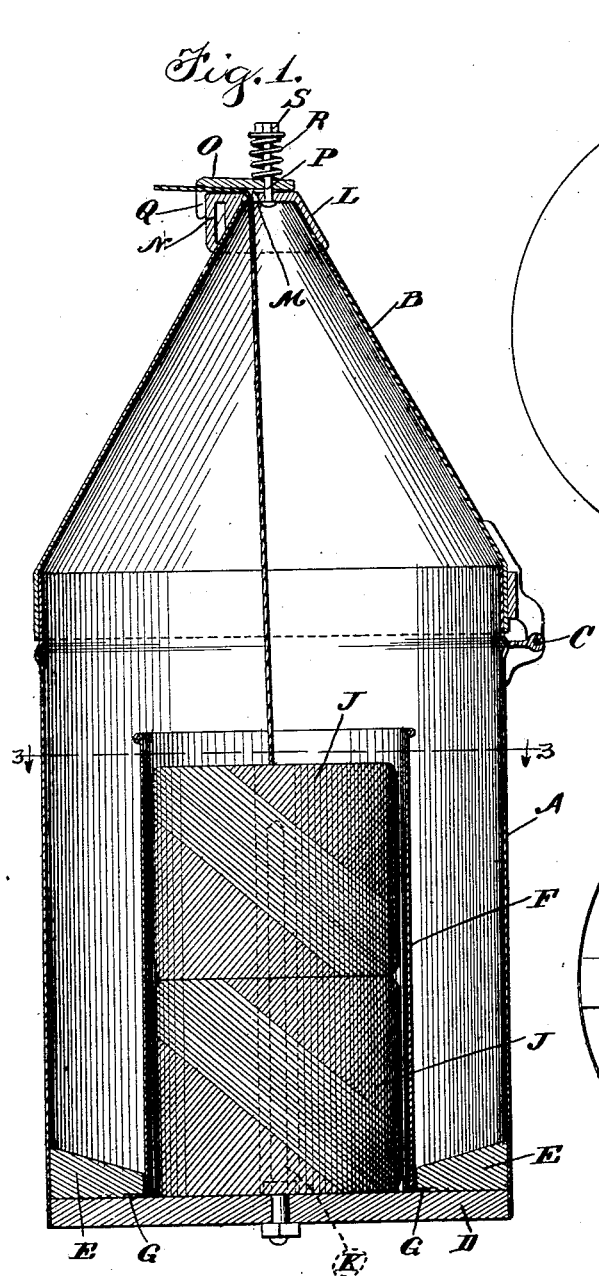
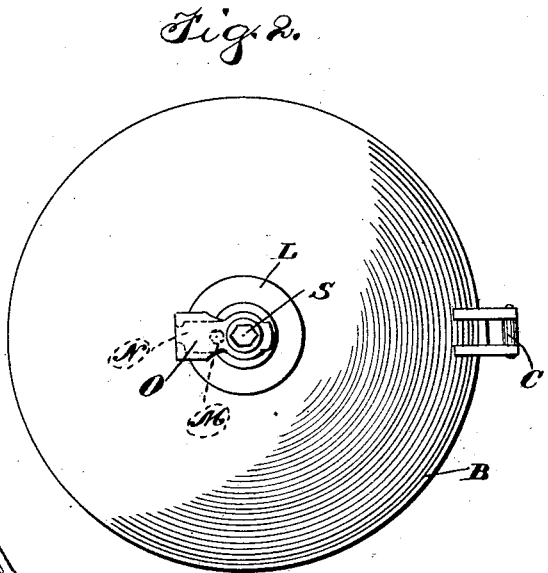
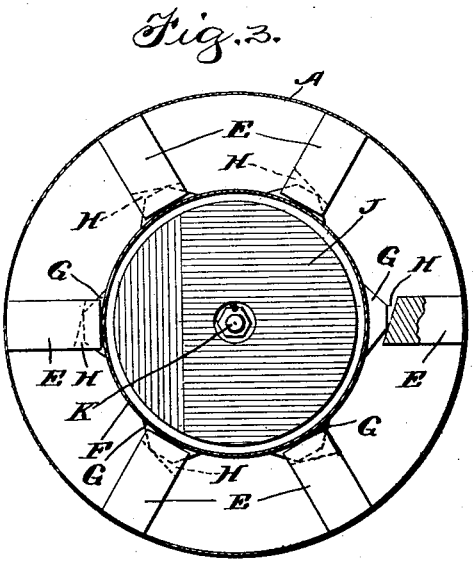
Witnesses:
J. B. Weir
Ira D. Perry
Inventor:
Paul Hanson
By Brown & Darby
Attys No. 745,833. Patented December 1, 1903.

UNITED STATES PATENT OFFICE.

PAUL HANSON, OF ST. PAUL, MINNESOTA.

TWINE-CAN FOR HARVESTING-MACHINES.

SPECIFICATION forming part of Letters Patent No. 745,833, dated December 1, 1903.

Application filed February 28, 1902. Serial No. 96,052. (No model.)

*To all whom it may concern:*

Be it known that I, PAUL HANSON, a citizen of the United States, residing at St. Paul, in the county of Ramsey and State of Minnesota, have invented a new and useful Twine-Can for Harvesting-Machines, of which the following is a specification.

This invention relates to twine-cans for harvesting-machines, and is particularly designed as an improvement on the construction set forth and claimed in my pending application, Serial No. 78,840, filed October 16, 1901.

The object of the invention is to provide a twine can or holder for harvesting-machines which is simple and efficient and combines within itself means for carrying a cop or ball of grass twine and also one or more cops or balls of ordinary Sisal or Manila twine, such as is ordinarily employed in grain-binding mechanisms.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in vertical section through a twine-can embodying the principles of my invention, the ball or cop of grass twine being removed and showing two balls or cops of ordinary Sisal or Manila binder-twine. Fig. 2 is a top plan view of the same. Fig. 3 is a transverse section on the line 3 3 of Fig. 1 looking in the direction of the arrows.

The same part is designated by the same reference-sign wherever it occurs throughout the several views.

In my prior application I have set forth, described, and claimed a construction of twine-can especially adapted for use as a holder for grass twine employed in connection with harvesting machinery for binding grain. As is well known, grass twine employed for this purpose is of larger diameter than other twine—such as Sisal, Manila, and the like—employed for the same purpose, and consequently for the same length of twine the cop or ball is of much larger size, requiring a holder or can of comparatively large dimensions. In practice it is desirable to provide or equip the grain-binding mechanisms or machines with binder or knotter mechanisms equally well adapted for use with grass twine and the ordinary or usual Sisal or Manila twine. In such cases it is undesirable to supply the machine with two twine holders or cans—one for the grass twine and one for the Manila, Sisal, or other twine—on account of the additional expense involved and the limited space available for properly and suitably locating the twine can or holder.

It is the special purpose of my present invention to provide a twine can or holder in which provision is made for holding or carrying both grass twine and also the ordinary or usual Sisal or Manila twine, so that the same holder or can will serve for either character of twine, thus avoiding the necessity of two twine cans or holders, while at the same time supplying the machine or its equipment with either kind of twine.

Referring to the accompanying drawings, wherein I have shown a construction embodying the principles of my invention, reference-sign A designates the can or holder proper, which should be of sufficient internal diameter to receive the cop or ball of grass twine and which may be provided with a top or cover B. In the form shown, and preferably, this top or cover is of conical shape and is hinged to the body A, as at C, whereby access may be readily had to the interior of the can-body. On the upper and inner surface of the bottom D of the can A is provided a series of suitably-spaced wedge-blocks E, arranged in radial relation with respect to the can-bottom and the upper surface thereof inclined toward the center, as fully set forth in my prior application above mentioned. Upon the inclined surfaces of these blocks the ball or cop of grass twine is designed to rest.

F designates an inner cylindrical chamber or casing open at both ends and preferably provided at the lower end thereof with outturned flanges G. The wedge or inclined blocks E are grooved or rabbeted, as at H, on the under surface of their inner ends, as clearly shown, the outer walls of the rabbets or grooves being inclined, as clearly shown. The purpose of this construction is to enable the inner cylindrical casing F to be inserted in place with the projections G thereof occuing the space between adjacent wedge-blocks E. Now by imparting an axially-rotative movement to said inner casing F the flanges or projections G thereof will enter the rabbets or grooves H and, engaging the inclined outer side walls of said rabbets or grooves, will cause said inner casing F to be properly and accurately centered with reference to the inclosing or outer can-body A and also to be firmly and securely held in place. This inner cylindrical casing F is designed and is adapted to receive therein the Manila, Sisal, or other twine balls or cops, (indicated at J.) If desired, a central longitudinal pin or rod K may be arranged to extend longitudinally through the central opening in the cops or balls J and suitably supported upon the bottom or base plate D of the can or holder. This feature, however, is not essential so far as the present invention is concerned and is disclosed in my prior application.

From the foregoing description it will be seen that I produce an exceedingly simple, efficient, and economical construction of twine can or holder in which grass twine, as well as the ordinary Sisal or Manila twine, may both be carried.

The twine may be drawn from the cop or ball of either class of twine through any suitable tension device. I have shown a simple arrangement of tension device which is of such construction as will adapt it for use with either character of twine employed and which comprises a conical cap L, fitted over the upper conical end of the top B and adapted to be secured thereto in any suitable manner. This cap L is provided with an opening M therethrough, through which the twine may pass, and is also provided with a lateral angular extension N, having a groove in the upper surface thereof, through which the twine passes.

O designates a tension-plate loosely mounted upon a bolt P, carried by the cap L. The tension-plate O is provided with downturned flanges Q, arranged to engage over the angular extension N of the cap and between which the twine passes and is guided, as clearly shown in Fig. 1. The tension-plate O is yieldingly pressed toward or upon the surface of cap L in any suitable manner—as, for instance, by means of a spring R, interposed between said tension-plate and a nut S, mounted upon the upper end of bolt P, and by which the tension of said spring and of the tension-plate may be adjustably regulated.

By hinging the top or cover B, as at C, to the body or can A, I am enabled to locate the tension device in a permanent position relative to the can and the point toward which the twine is delivered, so as to secure the best results with reference to the line of pull exerted upon the twine, whereas if the top or cover B were not hinged at a fixed point, but was merely removable, an ignorant or careless operator after removing the top B might replace the same upon the can A, so as to have the line of pull in an inconvenient and undesirable direction.

It is believed that the construction and operation of my invention will be fully understood from the foregoing description.

Having now set forth the object and nature of my invention and a construction embodying the principles thereof, what I claim as new and useful and of my own invention, and desire to secure by Letters Patent, is—

1. In a twine can or holder for grain-binders, a receptacle of large diameter in combination with a central or auxiliary casing of smaller diameter removably arranged within said receptacle and adapted to receive cops or balls of twine of smaller size therein, and a twine-guide serving to guide the delivery of twine from either of said receptacles, as and for the purpose set forth.

2. In a twine can or holder for grain-binders, an outer can or receptacle and an inner casing or receptacle, and means for removably locking said inner casing or receptacle in place, in combination with a twine-guide carried by said outer casing and adapted to receive twine from either of said receptacles, as and for the purpose set forth.

3. In a twine can or holder for grain-binders, an outer receptacle adapted to receive a cop or ball of twine, an inner casing adapted to receive cops or balls of twine of smaller size, and means for detachably locking said inner casing in place within said outer receptacle, in combination with a twine-guide carried by said outer casing and adapted to receive twine from either of said receptacles, as and for the purpose set forth.

4. In a twine can or holder for grain-binders, the combination with an outer receptacle, of an inner receptacle, blocks arranged in said outer receptacle, flanges formed on said inner receptacle and arranged to engage said blocks to hold said inner receptacle in place, as and for the purpose set forth.

5. In a twine-can for grain-binders, an outer receptacle having blocks arranged therein, said blocks being rabbeted or grooved on their inner ends, in combination with an inner receptacle having flanges arranged to be received in said rabbets or grooves to lock said inner receptacle in place, as and for the purpose set forth.

6. In a twine can or holder, an outer receptacle having blocks arranged therein, said blocks being rabbeted or grooved on their inner ends, said rabbets or grooves having inclined outer walls, in combination with an inner receptacle having flanges or projections arranged to be received in said rabbets or grooves whereby by imparting a rotative movement to said inner receptacle it is locked in place, as and for the purpose set forth.

7. In a twine can or holder, an outer receptacle having a series of wedge-shaped radially-arranged blocks therein, said blocks provided with rabbets or grooves on their inner ends, in combination with an inner receptacle having laterally-projecting flanges adapted to be received in said rabbets or grooves to lock the same in place, as and for the purpose set forth.

8. In a twine can or holder for grain-binders, a receptacle adapted to receive the balls or cops of twine, in combination with a tension device through which the twine is adapted to be passed from said receptacle and comprising a cap having an angular extension to form a bearing-surface, a tension-plate mounted upon said cap and between which and the angular extension of said cap the twine is adapted to be passed, said tension-plate provided with flanges at the outer free end thereof arranged to engage over the outer edge of said extension and means for yieldingly pressing said tension-plate against said cap, as and for the purpose set forth.

9. In a twine can or holder for grain-binders, a receptacle adapted to receive the balls or cops of twine, a top for said receptacle, a cap carried by said top and provided with an opening therethrough, said cap having an angular extension to form a horizontal bearing-surface, a bolt carried by said cap, a tension-plate loosely mounted upon said bolt and between which and the horizontal bearing-surface of said cap the twine is adapted to be passed, said tension-plate having flanges at the outer free end thereof, said flanges engaging over the outer edge of said extension, and a spring arranged to bear upon said tension-plate and means for adjusting the tension of said spring, as and for the purpose set forth.

In witness whereof I have hereunto set my hand, this 25th day of February, 1902, in the presence of the subscribing witnesses.

PAUL HANSON.

Witnesses:
CHAS. H. SEEM,
S. E. DARBY.